United States Patent [19]

Benger et al.

[11] 4,158,260
[45] Jun. 19, 1979

[54] WRIST COMPASS AND TRANSIT

[75] Inventors: Richard T. Benger, Weston, Mass.; Benjamin D. Pollack, P.O. Box 417, Bantam, Conn. 06750

[73] Assignee: Benjamin D. Pollack, Bantam, Conn. ; by said Richard T. Benger

[21] Appl. No.: 792,794

[22] Filed: May 2, 1977

[51] Int. Cl.² ............................................. G01C 17/06
[52] U.S. Cl. ........................................... 33/272; 58/89
[58] Field of Search .................... 33/272, 273, 274; 224/28 W, 4; 58/89; 354/286

[56] References Cited

U.S. PATENT DOCUMENTS

| | | | |
|---|---|---|---|
| 2,358,589 | 9/1944 | Piffath | 33/272 X |
| 4,017,878 | 4/1977 | Hagiwara | 354/286 |

FOREIGN PATENT DOCUMENTS

| | | | |
|---|---|---|---|
| 347011 | 7/1960 | Switzerland | 33/272 |
| 795255 | 5/1958 | United Kingdom | 33/272 |

*Primary Examiner*—William D. Martin, Jr.
*Attorney, Agent, or Firm*—Dos T. Hatfield

[57] ABSTRACT

A wrist compass is formed with a base member having straps at each side for strapping to a user's wrist and with a detachable compass body having complementary interengaging surfaces for removably securing the compass body to the base member. The base member also is provided with folding lens and sight line elements to overlie the attached compass face in a folded position and to be erected to a sighting position when desired. The lens and sight line elements are preferably formed entirely of transparent material so that the compass face is visible when the elements are folded thereover.

2 Claims, 6 Drawing Figures

WRIST COMPASS AND TRANSIT

BACKGROUND OF THE INVENTION

Pocket compasses with folding lens and line sighting elements for transit purposes are well known and widely used by military personnel and others engaged in crosscountry pursuits. It has been found desirable to provide a compass with folding lens and line sighting elements that may be carried on the user's wrist rather than in a pocket and for compass purposes only, the arrangement of this invention enables the compass only to be removed from the wrist body carrying the lens and sighting elements, thus facilitating the use of the compass for direction purposes only.

PRIOR ART

The following listed United States patents show various arrangements of wrist compasses or combined transit sighting pocket compasses, but do not show the particular detachable compass and wrist-carried transit lens and sighting line arrangement having the advantages of the subject invention: U.S. Pat. Nos. 994,901; 1,571,697; 1,936,846; 1,961,067; 2,487,044.

SUMMARY

In accordance with this invention, a wrist compass is comprised of a base member having straps at each side for detachably securing the base member to a user's wrist. A compass body is provided with attaching surfaces for interengaging complementary attaching surfaces of the base member in a bayonet locking fashion by a simple slight rotational movement to attach or remove the compass body from the base member. The base member is also provided with a pivotal sighting lens element and a pivotal sighting line element adapted to overlie the face of the compass in a folded position when the compass is attached to the base element and to be pivotal to an erect sighting position when desired. In order that the compass may be visible and usable when secured to the wrist with the lens and sighting elements folded to overlie the compass face, both the lens and sighting elements are preferably formed entirely of transparent materials. Manually operated locking means is provided to lock the compass in the attached position on the wrist-supported base member.

Other features and advantages of the invention will be apparent with reference to the following described drawings and detailed description of the invention.

DETAILED DESCRIPTION OF PREFERRED EMBODIMENT

Figure 1:
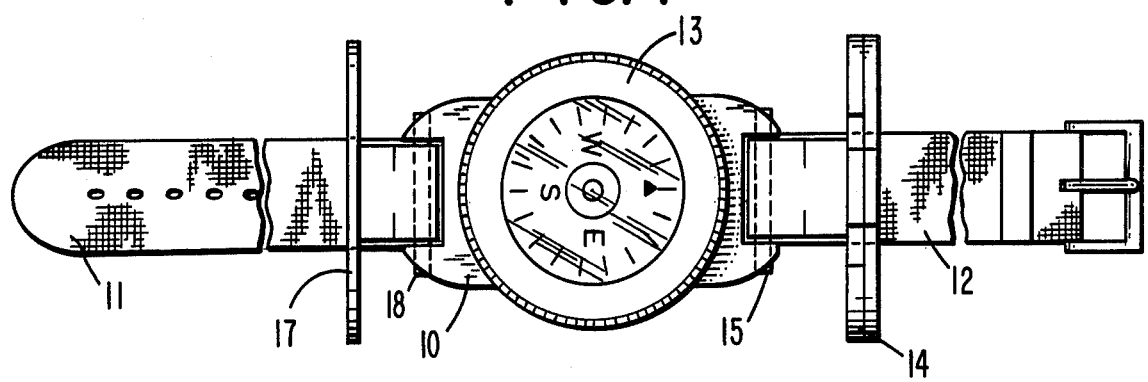
FIG. 1 is a top plan view of the compass attached to the wrist mounted supporting base with the transit lens and sight line elements erected.
Figure 2:
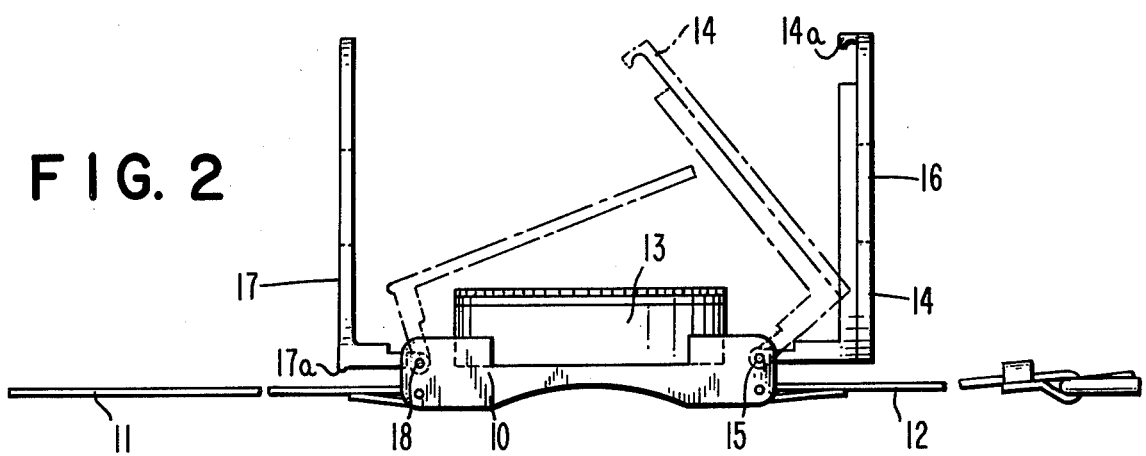
FIG. 2 is a side elevation of FIG. 1 also showing in dotted line position the folding arrangement for the transit lens and line sighting elements.
Figure 3:
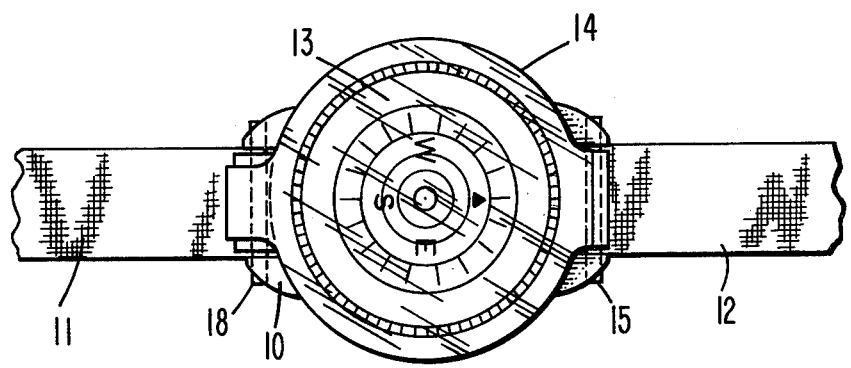
FIG. 3 is a view similar to FIG. 1 but showing the compass face visible through transparent lens and sighting line elements in their folded positions.

Referring first to FIGS. 1 to 3 of the drawings, a base member 10 is provided with wrist straps 11, 12 whereby the member 10 may be detachably secured to a user's wrist or other limb member. A compass body 13 is removably attached to the base member 10 in a manner to be later described in detail with reference to FIGS. 4 to 6 of the drawings. A sighting lens element 14 is pivotally secured at 15 to one side of the base member 10 and is provided with a sighting lens generally shown at 16. A sighting line element 17 is pivotally secured at 18 to the opposite side of the base member 10 (not shown). Both elements 14 and 17 may be erected as shown by FIG. 1, or may be folded as shown by FIG. 2 towards the fully folded position of FIG. 3 to overlie the face of the attached compass body. The lens element 14 may be provided with a resilient lip 14a adapted to engage the projection 17a of the slighting element 17 when both elements are folded over the compass body, thus serving to retain such elements in the folded positions. In order that the face of the compass 13 may be fully visible through the folded lens and sighting elements 14, 17, both elements 14, 17 are preferably formed entirely of transparent material, such as clear plastic or the like.

Figure 4:
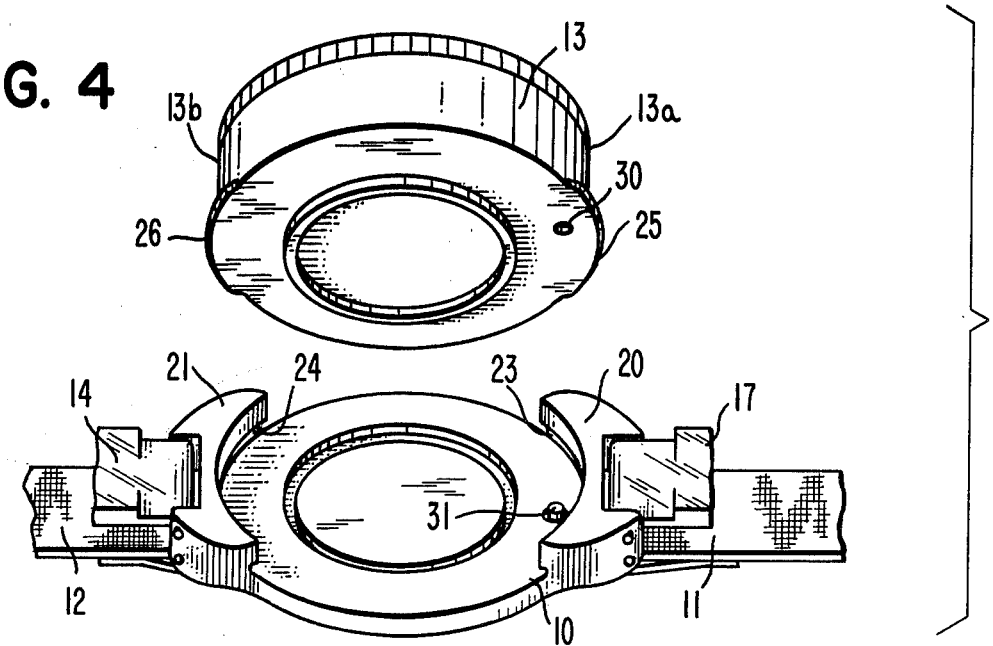
FIG. 4 is an exploded detail view showing the complementary interengaging attaching surfaces for both the base member and compass body.
Figure 5:
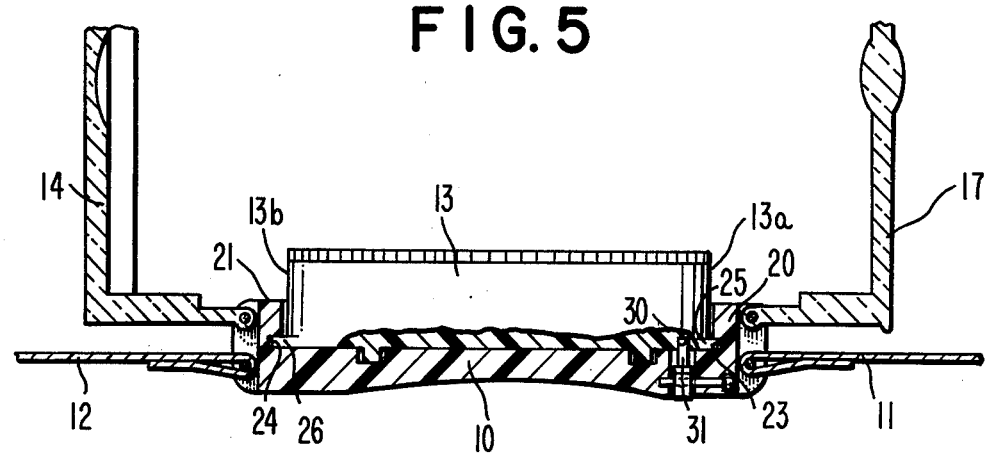
FIG. 5 is a detail view to show the locking arrangement for the compass body to the supporting base member.
Figure 6:
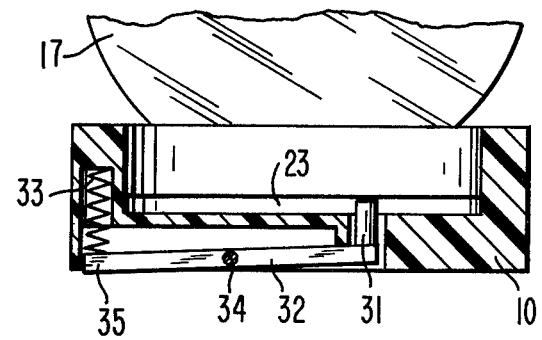
FIG. 6 is a detailed view of a presently preferred locking pin arrangement.

It may be desirable to use the compass body with attached transit line and lens elements while removed entirely from the supporting base, which may then be attached again to the user's wrist. Referring now to FIGS. 4 to 6 of the drawings, it will be seen that the compass body 13 is circular and the base member 10 is provided with circular flanges 20, 21 to closely engage the sides 13a, 13b of the circular compass body 13 when attached thereto, as shown most clearly by FIG. 5. Each flange 20, 21, is provided with respective slots 23, 24 in which are received in complementary interengaging fashion the bayonet lips 25, 26 formed at the base of the compass body 13. Thus, as should now be obvious, the compass body may be attached securely to the base member 10 by inserting the body between the flanges 20, 21 and rotating the lips 25, 26 into the respective slots 23, 24 of the base member 10.

In order to lock and retain the compass body 13 in the attached position on the wrist-supported base member 10, a detent 30 is provided on the underside of the compass body 13, as shown by FIG. 4. A locking pin 31 may be received in the detent 30, as shown by FIG. 5, and is normally urged to such position by the manually operated unlocking lever 32, shown by FIG. 6. The unlocking lever 32 is pivoted at 34 and by pressing the end 35 of the lever 32 against the pressure of the coil spring 33, the locking pin 31 is withdrawn from the recess 30 to permit the compass body 13 to be rotated in a manner to disengage the retaining lips 25, 26 from the base member slots 23, 24 so that the compass body 13 may be separated from the base member 10.

Although not claimed nor shown, a retractile measuring tape may be coiled within the compass body in a manner known to those skilled in the art.

Various modifications of the invention will occur to those skilled in the art.

What is claimed is:

1. A wrist compass comprising, a base member having straps at each side for detachably securing the base member to the user's wrist, a compass body, said compass body and said base member having complementary interengaging surfaces for detachably securing said compass body to said base member by rotating said body relative to said member from an attached position to a detached position, said base member having a transparent sighting lens carrying element that is pivotally secured to one side of the base to overlie in a folded position the compass face when said compass is attached to said base and to be movable from the folded position to an erect sighting position, a transparent sighting line element is pivotally secured to an opposite side of the base member in a manner to overlie in a folded position the folded position of said lens carrying element and compass face when said compass is attached to said base and to be movable from the folded position to an erect sighting position, whereby said compass is visible when both said lens carrying element and said sighting element are in folded position.

2. The invention of claim 1 in which manually operated locking means is provided to lock the compass body in the attached position.

* * * * *